United States Patent Office
2,843,614
Patented July 15, 1958

2,843,614
CHEMICAL COMPOSITION

Le Roy W. Clemence, Highland Park, Marlin T. Leffler, Lake Bluff, and Waverly D. Krueger, Winthrop Harbor, Ill., assignors to Abbott Laboratories, North Chicago, Ill., a corporation of Illinois No Drawing. Application April 29, 1955
Serial No. 505,042

5 Claims. (Cl. 260—440)

The present invention relates to arsenic derivatives of diphenylurea and more particularly to trivalent arsenic derivatives of diphenylurea in which the nitrogen atoms of the ureido linkage are symmetrically substituted.

Pentavalent arsenic compounds such as carbarsone and acetarsone have been used in the treatment of amebiasis for many years. More recently it has been shown that the trivalent arsenic compounds, carbarsone oxide, are active in human and animal amebiasis. The activity of these compounds, however, has not been particularly great and more effective therapeutic agents are desired.

It is therefore an object of the present invention to provide improved therapeutic agents which are effective in the treatment of amebiasis.

It is also an object of the invention to provide diphenylurea arsonoso derivatives which exhibit improved therapeutic activity against pathogenic strains of organisms causing animal and human amebiasis.

Other objects of the invention will be apparent from the following detailed description and claims.

It has been found that compounds having the general formula:

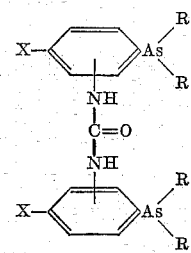

wherein X is a hydroxy group or a halogen atom and R is a hydroxy group or thioglycollic acid group, exhibit marked activity against organisms causing amebiasis, including the organism *Endameba histolytica*, N. R. S. strain.

The compounds having the above general formula are preferably prepared by reacting phosgene with the corresponding arsonosoaniline or with an aqueous solution of 3-amino-4-hydroxyphenyldichloroarsine hydrochloride or 3-amino-4-halophenyldichloroarsine hydrochloride. In preparing the thioglycollic acid derivatives disclosed herein, the corresponding arsonoso compounds are suspended in water and refluxed with an excess of thioglycollic acid to yield the corresponding thio di-substituted acids.

In the following examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

EXAMPLE I
N,N'-bis-(5-arsonoso-2-hydroxyphenyl)urea

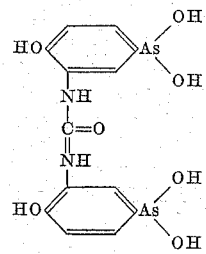

Phenarsine hydrochloride, 29 g. (0.1 mole), is dissolved in 100 cc. of water in a 150 cc., 3-necked, round bottom flask equipped with stirrer, thermometer and gas inlet tube. The solution is stirred and cooled to 10° C. A slow stream of phosgene is introduced below the surface of the phenarsine solution for about two hours. The temperature rises rapidly to 18–20° C. with excessive foaming. Toluene, 2–3 cc., is added to prevent foaming. After a short period of gassing at approximately 15° C., the solid becomes sticky and forms a solid ball. The reaction mixture is allowed to stand at room temperature. The solid material is dissolved in dilute sodium hydroxide. The alkaline solution is treated with Darco and filtered. The water-white solution is cooled in an ice bath, then acidified with concentrated hydrochloride. A white solid precipitates out and is separated by filtration and washed on the filter with approximately 200 cc. of water. The product is dried in a vacuum oven at 50° C. The above solid is dissolved in dilute sodium hydroxide and the volume of the solution is made up to 500 cc. with water. The light tan solution is treated with Darco and filtered and made solution just acid with concentrated hydrochloride. The white solid is washed on the filter until there is no test for chlorides using silver nitrate. The white solid is dried in a vacuum oven at 50–60° C. On chemical analysis the product is found to contain 5.80% N and 33.30% As, as compared with theoretical values of 6.09% N and 32.56% As.

EXAMPLE II
N,N'-bis-(5-arsonoso-2-chlorophenyl)urea

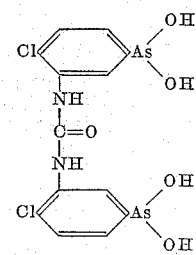

3-amino-4-chlorophenyldichloroarsine hydrochloride, 13.2 g., is placed in a 250 cc., 3-necked, round bottom flask equipped with stirrer, thermometer and gas inlet tube. Water, 100 cc., is added to the 3-amino-4-chlorophenyldichloroarsine hydrochloride, forming a cloudy solution. The reaction mixture is cooled in an ice bath and a slow stream of phosgene, 3 g., is introduced below the surface of the aqueous solution for about two hours. Almost immediately a white solid precipitates from the mixture and the mixture begins to foam. By gassing intermittently, the foam is controlled and gassing is continued for 1½ hours. The mixture is allowed to stand at room temperature overnight. The white solid is separated by filtration and sucked as dry as possible. The white solid is then dissolved in a 20% solution of sodium hydroxide. The solution is treated with Darco and then filtered through a sintered glass funnel. The water-white, clear filtrate is treated with an excess of concentrated ammonium chloride solution. The solid product is filtered off and washed several times with water and allowed to stand at room temperature. The filtrate from the previous washes gives a silver nitrate test for chlorides. The solid is removed from the filter and suspended in 400 cc. of distilled water. The suspension is brought to a boil and the white solid is filtered off while still hot. The solid is washed on the filter with two 250 cc. portions of water. The last wash gives a negative test with silver nitrate. The product is sucked as dry as possible and dried in a vacuum oven at 50° C. for 48 hours. On chemical analysis the product is found to contain 30.75% As and 5.35% N, as compared with theoretical values of 30.15% As and 5.64% N.

EXAMPLE III

N,N'-bis-[5-(dicarboxymethylthio)-arsylene-2-hydroxyphenyl]urea

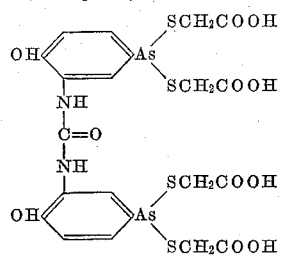

A suspension of N,N' - bis-(5 - arsonoso-2 - hydroxyphenyl)urea, 42.4 g. (0.1 mole), as prepared in Example I, in 500 cc. of water is treated with thioglycollic acid, 46 g. (0.5 mole). The mixture is refluxed until all the solid dissolves. The clear hot solution is filtered and allowed to cool slowly. The oil which separates solidifies on further cooling in an ice bath. The solid is then isolated by filtration. The crude product is then dissolved in 100 cc. of ethanol, treated with charcoal and filtered. The clear filtrate is diluted with 1.5 liters of warm water and the clear solution cooled in an ice bath. The white solid which slowly separates is isolated by filtration and dried in a vacuum oven at 60° C. On chemical analysis the product is found to contain 19.49% As and 3.5% N, as compared with theoretical values of 19.78% As and 3.7% N. The sodium salt of the said product is readily formed by treating with dilute sodium hydroxide and removing water.

It will be apparent that the compound N,N'-bis-(5-(dicarboxymethylthio)-arsylene-2-chlorophenyl]urea can be prepared by the procedure of Example III wherein an aqueous suspension of N,N'-bis-(5-arsonoso-2-chlorophenyl)urea of Example I is treated with thioglycollic acid.

The compounds disclosed in the foregoing specific examples are useful as intermediates in the preparation of chemical products and/or themselves exhibit marked activity against *Endameba histolytica* N. R. S. strain, when tested using a modification of the Bradin and Hansen method, Am. J. of Trop. Med., 30, 27 (1950), in which a liquid liver-proteose-peptone medium is used and wherein readings are made 48 hours after introduction of the drug. The compounds of the present invention kill *Endameba histolytica* at minimum dilutions of 1:100,000 to 1:200,000. Carbarsone in the foregoing tests shows an activity at 1:20,000 minimum dilution. In vivo tests show the compounds of the present invention to be effective when administered orally in amounts of from 25 mg./kg. to 100 mg./kg. body weight. The compounds can be used in the acid form or as in the form of a non-toxic salt.

Others may readily adapt the invention for use under various conditions of service, by employing one or more of the novel features disclosed or equivalents thereof. As at present advised with respect to the apparent scope of our invention, we desire to claim the following subject matter.

We claim:

1. A chemical compound selected from the group consisting of the compounds having the general formula:

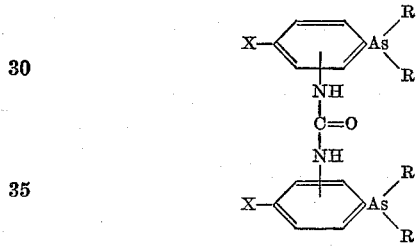

wherein X is selected from the group consisting of a hydroxy group and a halogen atom and R is selected from the group consisting of —OH and —SCH₂COOH, and the sodium salt thereof.

2. A chemical compound N,N'-bis-(5-arsonoso-2-hydroxyphenyl)urea.

3. A chemical compound N,N' - bis - (5 - arsonoso-2-chlorophenyl)urea.

4. A chemical compound, N,N'-bis - [5-(di - carboxymethylthio)-arsylene-2-hydroxyphenyl]urea.

5. A chemical compound, N,N' - bis-[5-(di - carboxymethylthio)-arsylene-2-chlorophenyl]urea.

References Cited in the file of this patent

UNITED STATES PATENTS

| 2,516,831 | Rohrmann | Nov. 17, 1947 |
| 2,664,432 | Friedheim | Dec. 29, 1953 |

FOREIGN PATENTS

| 848,386 | France | July 24, 1939 |